Patented June 16, 1936

2,044,318

UNITED STATES PATENT OFFICE 2,044,318

MONO-CYCLOHEXYL-1,2-DIHYDROXY-BENZENES

Lindley E. Mills and Bruce L. Fayerweather, Midland, Mich., assignors to The Dow Chemical Company, Midland, Mich., a corporation of Michigan No Drawing. Application October 9, 1935, Serial No. 44,232

3 Claims. (Cl. 260—154)

This invention consists in a new group of compounds, namely, mono-cyclohexyl-catechols or mono-cyclohexyl-1,2-dihydroxybenzenes.

We have prepared the aforementioned compounds, determined certain physical properties thereof whereby they may be readily identified, and found that they may be advantageously used for various purposes such as the inhibition of gum and color formation in petroleum distillates. The invention, then, consists of the new products hereinafter fully described and particularly pointed out in the claims.

The compounds included within the scope of our invention have the following general structural formula:

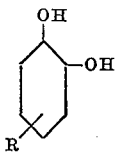

wherein R represents the cyclohexyl group.

The mono-cyclohexyl derivatives of 1,2-dihydroxybenzene can be prepared by the hydrolysis of a mono-cyclohexyl-2-halo-1-oxybenzene in the presence of cuprous oxide. The mono-cyclohexyl compound to be hydrolyzed should contain the cyclohexyl group in the position, i. e. either 3 or 4 position, in which the cyclohexyl group is to appear in the product to be made. For example, in making 3-cyclohexyl-1,2-dihydroxybenzene, 3 - cyclohexyl - 2 - halo - 1 - oxybenzene should be employed as the starting material. The compounds can also be prepared by condensing 1,2-dihydroxybenzene (catechol) with cyclohexene, cyclohexanol, or chlorocyclohexane, in the presence of zinc chloride or aluminum chloride.

The compounds are white, crystalline substances; very slightly soluble in water, either hot or cold; very soluble in gasoline, benzene, alcohol, acetone, ether, and most organic solvents. They are soluble in dilute alkali metal hydroxide solutions, such solutions upon exposure to air rapidly becoming colored.

As an example showing in detail one method used in preparing a specific member of our new class of compounds:—a solution was prepared containing 105 grams (2.5 mols) of 95 per cent sodium hydroxide and 1900 grams (105 mols) of water. To this solution was then added 127.5 grams (0.5 mol) of 2-bromo-4-cyclohexylphenol and 10 grams (0.07 mol) of cuprous oxide. The reaction mixture was then refluxed over a period of 4 hours and 15 minutes, filtered to remove the catalyst, and acidified with dilute sulphuric acid. On cooling, a dark, viscous, oily layer containing the new compound separated out. The reaction mixture was extracted with diethyl ether, which was distilled off at atmospheric pressure to recover the same, and the residue then distilled under reduced pressure to obtain 56 grams of 4-cyclohexyl-1,2-dihydroxybenzene. This represents a 58.5 per cent of theoretical yield. The compound melts at approximately 107.8–108.6° C. It boils at 180–183° C. under an absolute pressure of 4–6 millimeters of mercury. The density of the compound is 1.069 at 100° C., compared with water at 25° C.

We have determined that our new class of compounds can be incorporated with gasoline, particularly "cracked" gasoline, to inhibit the formation of gums and color therein. The solubility of the compounds in gasoline is so great that concentrated solutions thereof can be readily prepared, and such concentrated solutions diffuse perfectly throughout large quantities of gasoline upon the introduction of small amounts of the concentrate thereinto. The proportion of the foregoing compounds which we have found sufficient in admixture with either "cracked" or "straight-run" gasoline to suppress decomposition and gum formation therein is exceedingly small, e. g. between about 0.001 and 0.05 per cent by weight.

Other modes of applying the principle of our invention may be employed instead of the one explained, change being made as regards the materials employed, provided the product claimed in the following claims be thereby obtained.

We therefore particularly point out and distinctly claim as our invention:

1. Mono-cyclohexyl-1,2-dihydroxybenzene having the following structural formula:

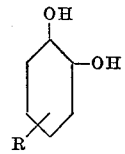

wherein R represents the cyclohexyl group.
2. 4-Cyclohexyl-1,2-dihydroxybenzene.
3. 3-Cyclohexyl-1,2-dihydroxybenzene.

LINDLEY E. MILLS.
BRUCE L. FAYERWEATHER.